United States Patent
Dreps et al.

(10) Patent No.: US 7,129,859 B2
(45) Date of Patent: Oct. 31, 2006

(54) METHOD AND APPARATUS FOR MINIMIZING THRESHOLD VARIATION FROM BODY CHARGE IN SILICON-ON-INSULATOR CIRCUITRY

(75) Inventors: Daniel M. Dreps, Georgetown, TX (US); Robert J. Reese, Austin, TX (US); Hector Saenz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 161 days.

(21) Appl. No.: 10/896,504

(22) Filed: Jul. 22, 2004

(65) Prior Publication Data

US 2006/0033646 A1 Feb. 16, 2006

(51) Int. Cl.
*H03M 7/00* (2006.01)
(52) U.S. Cl. .......................... 341/50; 380/46
(58) Field of Classification Search .............. 341/50; 380/46
See application file for complete search history.

(56) References Cited

U.S. PATENT DOCUMENTS 3,784,743 A * 1/1974 Schroeder ............... 380/46
5,894,517 A * 4/1999 Hutchison et al. ......... 713/189
6,933,862 B1 * 8/2005 Neff ....................... 341/50
2004/0091029 A1 * 5/2004 Weiner et al. ............ 375/220

OTHER PUBLICATIONS

Benini, L. et al.; Energy-efficient data scrambling on memory-processor interfaces;☐☐Proceedings of the 2003 International Symposium on Low Power Electronics and Design, 2003. ISLPED '03. ☐☐Aug. 25-27, 2004 pp. 26-29.*

* cited by examiner

*Primary Examiner*—Howard L. Williams
(74) *Attorney, Agent, or Firm*—Richard F. Frankeny; Winstead Sechrest & Minick P.C.

(57) ABSTRACT

Circuitry used to de-skew data channels coupling parallel data signals over a communication link employs SOI circuitry that is subject to generating pulse distortion due to the history effect modifying threshold voltages. To substantially eliminate the pulse distortion, data signals are XOR with a repeating scramble data pattern that generates scrambled data with a minimum average ratio of logic ones to logic zeros logic zeros to logic ones. The scrambled data is sent over the communication link and de-skewed in the SOI circuitry with little or no pulse distortion. The scramble data pattern is again generated at the receiver side of the communication link after a delay time to synchronize the logic states of the scramble data pattern that generated the scrambled data with the scrambled data at the receiver side. The delayed scrambled data pattern is again XOR'ed with the scrambled data to recover the data signal.

20 Claims, 6 Drawing Sheets

METHOD AND APPARATUS FOR MINIMIZING THRESHOLD VARIATION FROM BODY CHARGE IN SILICON-ON-INSULATOR CIRCUITRY

TECHNICAL FIELD

The present invention relates in general to complementary metal oxide semiconductor (CMOS) circuitry and in particular to Silicon-on-Insulator (SOI) CMOS circuitry.

BACKGROUND INFORMATION

In a typical data communications system, data must be sent from some driving latch and captured at a receiving latch. FIG. 1 shows basic block diagrams of such a data communications system implemented as either a chip-to-chip interface 100 or an on-chip interface 120. In a chip-to-chip interface 100, various components such as off-chip drivers (e.g., 103) and receivers (e.g., 105), transmission lines (e.g., 104) (printed wiring boards and/or cables), and some amount of logic circuitry (e.g., 106) will exist in the communications path. In contrast, an on-chip interface will typically comprise only internal logic gates (e.g., 109, 110, and 111) in the communications path.

Either of these communications systems may be implemented using SOI technology which give rise to the "history effect" which cause pulse width distortions. The history effect occurs when an SOI gate sustains a steady logic state (logic one or logic zero). The steady logic state tends to modify the body charge on SOI devices which in turn changes the gate threshold voltage which determines voltage levels at which logic state switching occurs. If one logic transition to a logic state occurs with one body charge condition and the next transition occurs with another different body charge condition, then the resulting pulse width will be modified (history effect) which may lead to timing errors. This history effect is typically fixed by using body-contacted devices; however, at high enough frequencies the body (dis)charge time constant is larger than the pulse width so the history effect may remain even with body-contacted devices. If the SOI devices are not body-contacted, then they are floating-body devices and as such have a much longer body charge/discharge time constant which may be exploited.

FIG. 2 is a timing diagram that illustrates the pulse modification in a SOI device due to the history effect discussed above. Of particular interest is what happens to the data as it passes through the blocks labeled "logic gates" in FIG. 1 since these blocks have the greatest impact on the SOI history effect depending on the total delay through these sections. To explain the pulse modification on an input (trace 201) due to the history effect, some basic time delays through the logic gates are defined. Propagation delay T prop is the amount of time that it takes for a signal to travel through the logic gates. The amount of delay due to the history effect is defined as T hist. Ideally, (trace 202) the first and second consecutive logic state transitions at a given frequency will propagate through the logic gates with a delay of T prop as shown in FIG. 2. However, in SOI technology, the first logic transition is delayed (T prop+T hist) whereas the second consecutive logic transition is delayed by only T prop resulting in the pulse distortion shown in trace 203 FIG. 2.

In an exemplary chip-to-chip interface 100, the logic gates 106 after the transmission line receiver 105 of FIG. 1 is replaced by a programmable delay circuitry which may selectable delay from zero picoseconds (0 psec)–500 psec for correcting the delay differences between parallel data channels. If the history effect caused a 10% history effect, then the delay circuitry would have a worst case 50psec pulse distortion. These channels may be clocked from 2 Gigabits per second (Gbps) to 5Gbps. At 5 Gbps, a 200 psec pulse would compress to 150 psec. This amount of pulse distortion along with the uncertainties of jitter and latch setup/hold times will result in high bit-error rates if uncompensated. One method of reducing the pulse distortion produced in such delay circuitry is to replace the delay circuitry with logic (not shown) that is clocked with multiple phases of a phase shifted clock configured to emulate the function of the delay circuitry. This resolves the problem because now a continuous pattern is being driven through the logic and the body voltage of the field effect transistor (FET) devices in the clocked logic maintains a constant charge and thus a fixed threshold voltage. However, this solution requires far more power and is thus less efficient requiring more power which is exacerbated by high frequency.

There is, therefore, a need for a method and circuitry to minimize the shift in gate threshold in SOI CMOS devices while maintaining the power efficiency of the delay circuitry for de-skewing parallel data channels.

SUMMARY OF THE INVENTION

A repeating scramble pattern having predetermined characteristics is exclusive OR'ed (XOR'ed) with the data generating a scrambled data pattern. The scramble pattern is configured to insure that the ratio of logic ones to logic zeros or the ratio of logic zeros to logic ones in the scrambled data pattern lie in a region between a predetermined minimum percentage (e.g., 25%) that has been determined to keep the body voltage substantially fixed and 50%. The scrambled data pattern is sent over the communication channel where it is received and coupled as the input to the delay circuitry which has been programmed to de-skew the parallel communication channels. The scramble pattern is a repeating pattern that is gated to start at a predetermined clock cycle. It is known that the logic transition of the predetermined clock cycle will propagate to the receiving side in the de-skewed propagation time. Therefore, a de-scramble pattern is synchronized with the scramble pattern to start at the predetermined clock cycle delayed by the propagation time. The de-scramble pattern is the same as the scramble pattern. The de-scramble pattern is XOR'ed with the received scrambled data pattern to recover the original data. Since the scrambled data has a guaranteed minimum average transition activity designed to keep the body voltage stable, the recovered data does not have pulse width modification.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
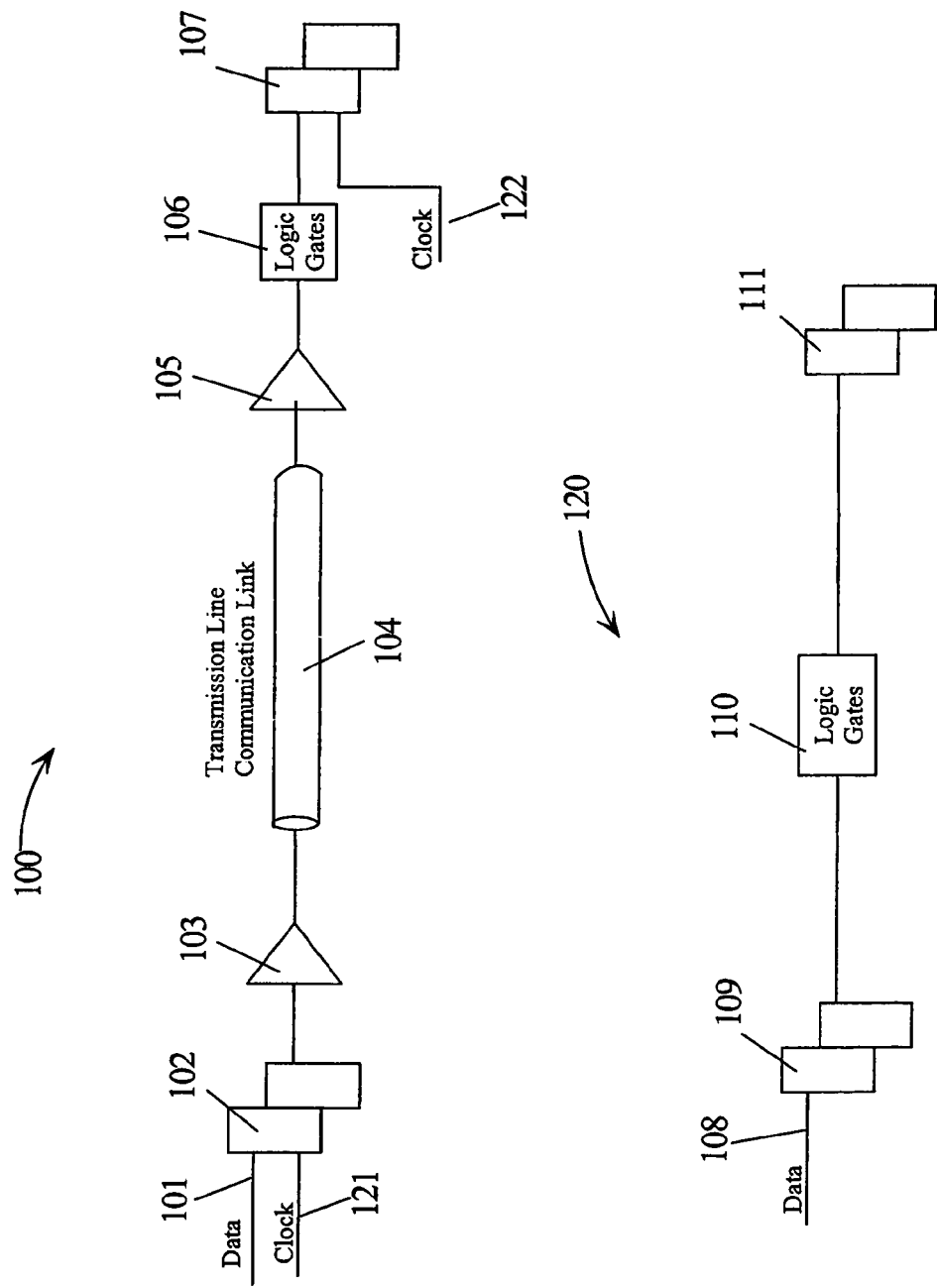
FIG. 1 illustrates a chip-to-chip and an on-chip communication path.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a chip-to-chip communication path 100 and an intra-chip communication path 120. In the chip-to-chip communication path 100, a data signal 101 is clocked into latch 102 by a clock signal 121 and then off-chip driver 103 drives the data signal through transmission line 104 to receiver 105. Logic gates 106 are used to process the bit stream represented by data signal 101 which is then latched in latch 107 in response to a clock signal 122 synchronous with the clock signal 121. In the inter-chip communication path 120, a data 108 is latched into a latch 109 and then passes through logic gates 110 to a latch 111.

Figure 2:
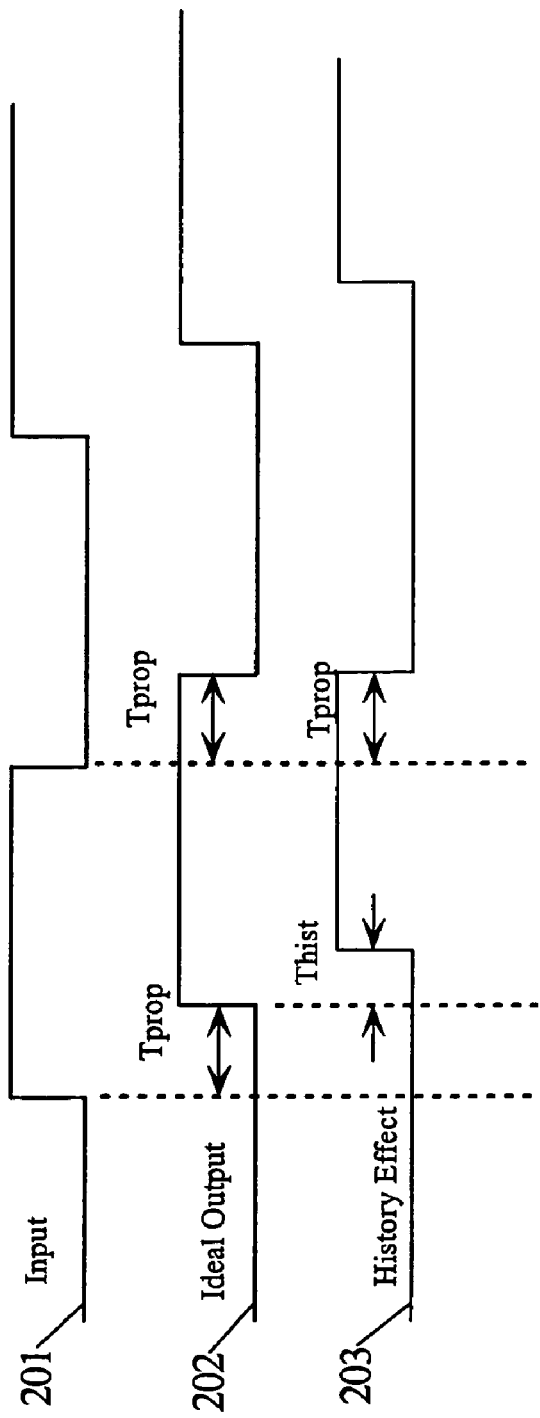
FIG. 2 is a timing diagram illustrating the history effect.

FIG. 2 illustrates what happens to an input data signal 201 as it experiences the history effect when passing through an SOI logic circuit (not shown). Trace 202 illustrates an "ideal" output wherein the SOI logic circuit would simply delay each edge by a propagation time Tprop. Trace 203 illustrates the output from the SOI logic circuit with the history effect. The first transition has a delay that includes the propagation delay Tprop and the delay Thist due to threshold modification of the history effect. In this instance, input 201 remaining at a logic zero for an extended period of time causes the body voltage to increase the threshold so that the transition from a logic zero to a logic one adds additional delay.

Figure 3:
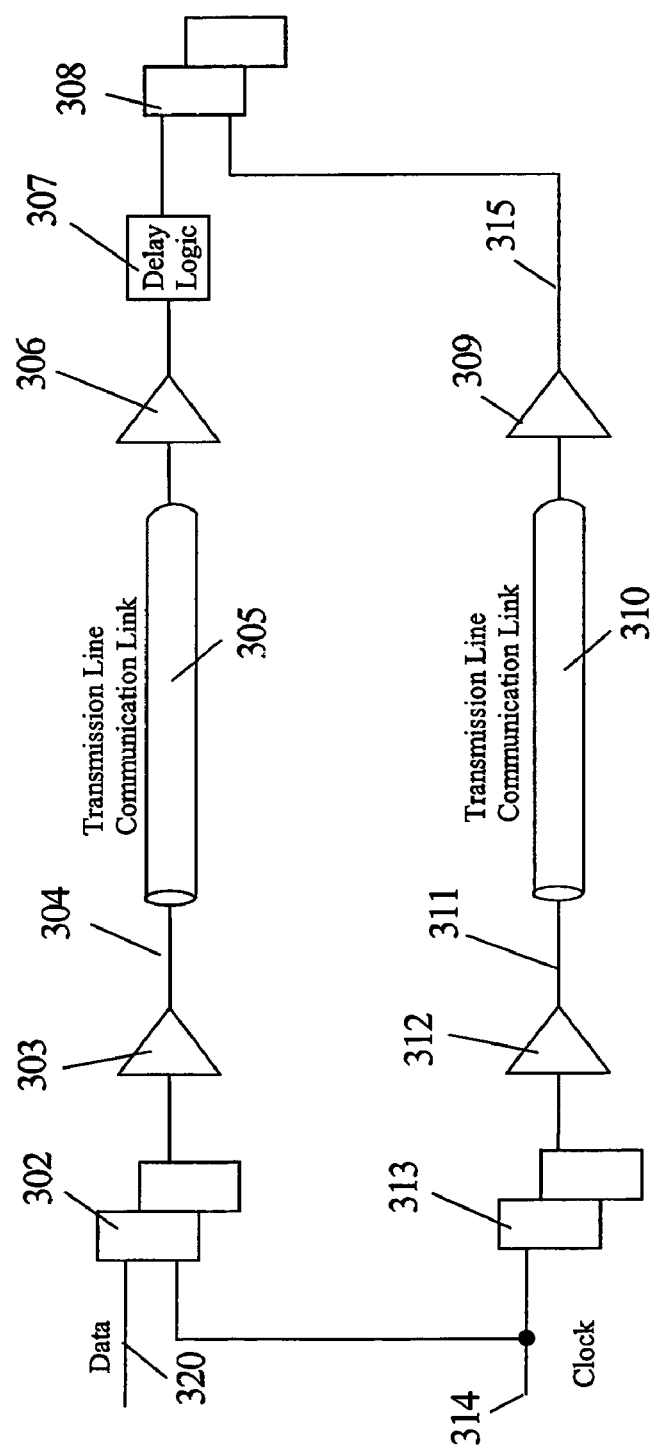
FIG. 3 illustrates chip-to-chip communication of a data signal and a clock signal.

FIG. 3 is a circuit diagram of a circuit path for transmitting a data signal 320 from a latch 302 in one chip to a latch 308 in another chip using source synchronous interface. Data signal 320 is latched into latch 302 and driver 303 outputs data signal 320 to input 304 of transmission line 305. Receiver 306 receives data signal 320 a delay time later. Logic gates 307 form a programmable delay circuit that is used to synchronize data signal 320 with clock 314 at the output 315 of receiver 309. Clock 314 on output 315 clocks data 320 into latch 308. If the logic gates 307 forming the delay circuitry are SOI and the frequency of data 320 is high enough, then periods of extended logic one or logic zero states on data signal 320 may lead to pulse distortion in logic gates 307.

Figure 4:
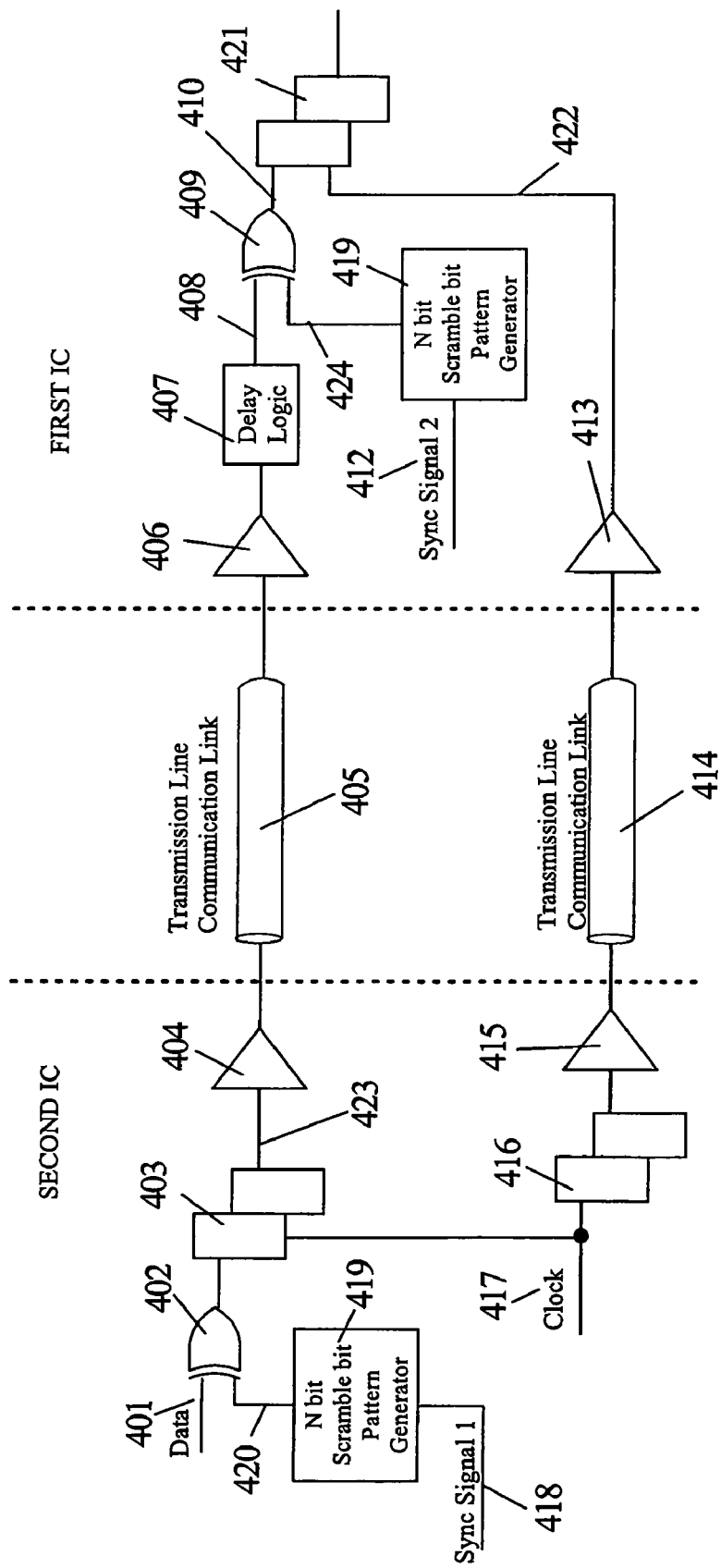
FIG. 4 illustrates chip-to-chip communication of a data signal and a clock signal using a scramble pattern according to embodiments of the present invention.

FIG. 4 is a circuit diagram of scramble circuitry used to prevent history effect using source synchronous interface with SOI circuitry. A sync signal 418 is used to start scramble pattern generator 419. N bit scramble bit pattern 420 is combined with data 401 in exclusive OR (XOR) gate 401. N bit scramble bit pattern 420 is configured to insure that the output of XOR gate 401 has sufficient transitions to prevent the history effect from causing pulse distortion. The scrambled data 423 is latched into latch 403 with clock 417 in the first IC circuit. Driver 404 drives the scrambled data 423 over transmission line 405 to receiver 406. The SOI circuitry 407 for processing data signal 420 now processes scrambled data 423 generating output 408. Since scramble data 423 has a predetermined state change activity, there is little pulse distortion in SOI circuitry 407. N bit scramble bit pattern 424 on output 408 is then combined with scramble data pattern 408 in XOR gate 409 to recover the original logic states of data signal 401. N bit scramble bit patterns 420 and 424 are the same pattern shifted a propagation delay time. A calibration cycle is employed to synchronize sync signal 418 and sync signal 412 so that N bit scramble bit pattern 424 is generated synchronous with the logic states produced by corresponding bits of N bit scramble bit pattern 420 in XOR gate 402. Clock signal 417 is processed through latch 416, driver 415, transmission line 414, and receiver 413 to produce clock 422. If SOI circuitry 407 assures that data signal 401 and clock 422 are source synchronous, then de-scrambled data signal (detected data) 410 and clock 422 will be likewise source synchronous with little or no pulse distortion of data signal 401 due to the history effect in SOI circuitry 407 when latched into latch 421.

The only potential problem that may result is that the data signal 401 and the N bit scramble bit pattern 420 are one in the same. While this is a low probability, it will generate a scrambled data pattern with only one logic transition over the particular length of the N bit scramble bit pattern 420. However, this event will only happen once within the scramble pattern cycle. Because of the time constant of the body voltage, it will not change significantly over this time period. On the next N bit scramble bit pattern cycle, the N bit scramble bit pattern 420 will resume with a normal distribution of logic state transitions as the data signal 401 and the scramble data pattern 423 will again be different.

Figure 5:
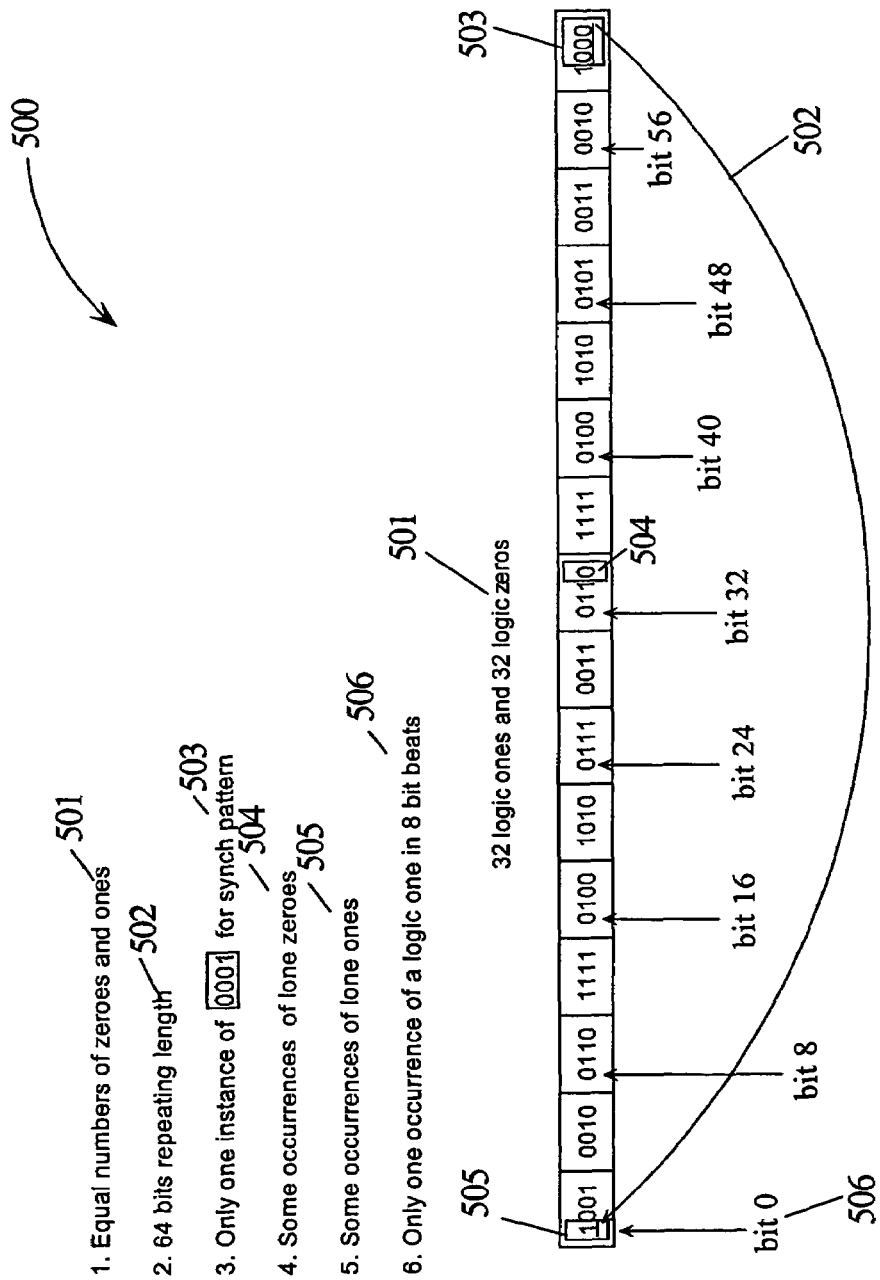
FIG. 5 illustrates a scramble pattern suitable for use with embodiments of the present invention.

FIG. 5 illustrates a 64-bit scramble data pattern 500 that has attributes 501–506 and is suitable for practicing embodiments of the present invention. Attribute 501 is an equal number of logic ones and logic zeros, in this case, 32 logic ones and 32 logic zeros. Scramble data pattern 500 loops back to form a 64 bit repeating pattern (attribute 502). To assure synchronization within scramble data pattern 500, there is only one instance of the 0001 pattern (attribute 503) which occurs over bits 61, 62, 63 and 0. If the scramble data pattern 500 is stored in a shift register, then a logic AND of 4 consecutive bits can locate the 0001 pattern to synchronize outputting scramble data pattern 500 to combine with a data signal (e.g., data signal 401). Attribute 504 assures some occurrences of lone logic zeros and attribute 505 assures some occurrences of lone logic ones. Finally, attribute 506 assures that when considering 8-bit beats (e.g., bit 0, bit 8, bit 16, etc.) there is only one occurrence of a logic one (bit 0). While other scramble data patterns are possible and within the scope of the present invention, scramble data pattern 500 assures that there will be on average a minimum of 25% ratio of logic ones to logic zeros or logic zeros to logic ones in a scrambled data (e.g., scrambled data 423). Scramble data pattern cycles with less that 25% ratio occur with an infrequency that the body voltage time constant does not allow significant threshold voltage variations.

Figure 6:
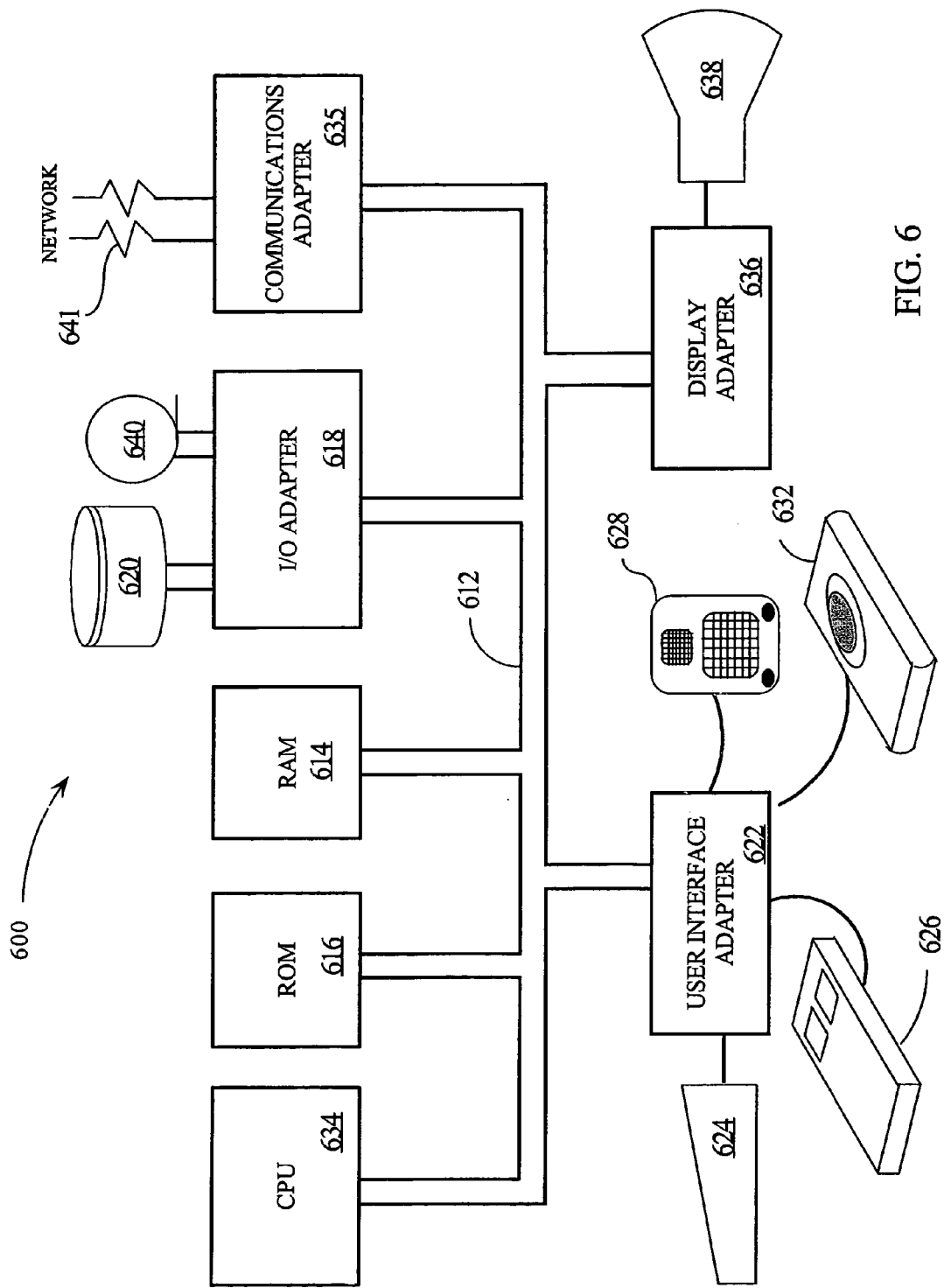
FIG. 6 is a block diagram of a data processing system suitable to practice embodiments of the present invention.

FIG. 6 is a high level functional block diagram of a representative data processing system 600 suitable for practicing the principles of the present invention. Data processing system 600 includes a central processing system (CPU) 610 operating in conjunction with a system bus 612. System bus 612 operates in accordance with a standard bus protocol, such as the ISA protocol, compatible with CPU 610. CPU 610 operates in conjunction with electronically erasable programmable read-only memory (EEPROM) 616 and random access memory (RAM) 614. Among other things, EEPROM 616 supports storage of the Basic Input Output System (BIOS) data and recovery code. RAM 614 includes, DRAM (Dynamic Random Access Memory) system memory and SRAM (Static Random Access Memory) external cache. I/O Adapter 618 allows for an interconnection between the devices on system bus 612 and external peripherals, such as mass storage devices (e.g., a hard drive, floppy drive or CD/ROM drive), or a printer 640. A peripheral device 620 is, for example, coupled to a peripheral control interface (PCI) bus, and I/O adapter 618 therefore may be a PCI bus bridge. User interface adapter 622 couples various user input devices, such as a keyboard 624 or mouse 626 to the processing devices on bus 612. Display 638 which may be, for example, a cathode ray tube (CRT), liquid crystal display (LCD) or similar conventional display units. Display adapter 636 may include, among other things, a conventional display controller and frame buffer memory. Data processing system 600 may be selectively coupled to a computer or telecommunications network 641 through communications adapter 634. Communications adapter 634 may include, for example, a modem for connection to a telecom network and/or hardware and software for connecting to a computer network such as a local area network (LAN) or a wide area network (WAN). CPU 610 and other components of data processing system 600 may contain DLL circuitry for local generation of clocks wherein the DLL circuitry employs a phase detector according to embodiments of the present invention to conserve power and to reduce phase jitter.

What is claimed is:

1. A method of minimizing pulse distortion in a silicon-on-insulator (SOI) first circuit receiving data over a data channel from a second circuit separated from the first circuit comprising the steps of:
   generating an N bit scramble bit pattern at the second circuit having a predetermined ratio of logic one states to logic zero states;
   generating a scrambled data pattern as a first logic exclusive OR (XOR) combination of first data from the second circuit and the N bit scramble bit pattern synchronized as a synchronized N bit scramble bit pattern;
   transmitting the scrambled data pattern over the data channel through the first circuit to an output of the first circuit;
   generating the synchronized N bit scramble bit pattern at the first circuit with a propagation delay time; and
   recovering the first data from the transmitted scrambled data pattern as detected first data by a second logic XOR combination of the scrambled data pattern coupled from the output of the first circuit and the synchronized N bit scramble bit pattern generated at the first circuit.

2. The method of claim 1, wherein the N is equal to 64.

3. The method of claim 1, wherein the synchronized N bit scramble bit pattern is generated by starting the N bit scramble bit pattern using a 4 bit sync bit pattern within the N bit scramble bit pattern.

4. The method of claim 3, wherein the propagation delay time is the time for a sync bit in the sync bit pattern to propagate from the second circuit to the output of the first circuit.

5. The method of claim 4, wherein the N bit scramble bit pattern assures that the scramble data pattern has an average ratio of logic one states to logic zero states greater than or equal to 25 percent.

6. The method of claim 3, wherein the N bit scramble bit pattern is consecutive bits 0 through 63 defined as sixteen 4 bit hex bytes [926F4A736F4A5328], the first byte starting at bit 0, the sixteenth hex byte starting at bit 60.

7. The method of claim 6, wherein bits 61, 62, 63 and 0 of the N bit scramble bit pattern define the 4 bit sync bit pattern and the first and second XOR combinations of the first data with the N bit scramble bit pattern commence at bit 0.

8. The method of claim 1, wherein the first circuit is a programmable delay circuit for phase aligning the data channel with a plurality of like data channels, wherein the data channel and the plurality of like data channel communicate parallel bits of data signal.

9. The method of claim 1, wherein the second circuit is a latch holding circuit that outputs the first data in response to a first transition of a first clock signal.

10. The method of claim 9, wherein the detected first data is clocked into a latch holding circuit in response to the first transition of a second clock signal of the same frequency and synchronous with the first clock signal.

11. A data processing system comprising:
   a central processing system (CPU);
   a random access memory (RAM); and
   a bus coupling the CPU and the RAM, wherein the CPU has a first and a second integrated circuit (IC) communicating parallel data bits over a data channel, the first IC having a silicon-on-insulator (SOI) first circuit receiving data over the data channel from a second circuit in the second IC, wherein the second IC has circuitry for generating an N bit scramble bit pattern at the second circuit having a predetermined ratio of logic one states to logic zero states, circuitry for generating a scrambled data pattern as a first logic exclusive OR (XOR) combination of first data from the second circuit and the N bit scramble bit pattern synchronized as a synchronized N bit scramble bit pattern, circuitry for transmitting the scrambled data pattern over the data channel through the first circuit to an output of the first circuit, circuitry for generating the synchronized N bit scramble bit pattern at the first circuit with a propagation delay time, and circuitry for recovering the first data from the transmitted scrambled data pattern as detected first data by a second logic XOR combination of the scrambled data pattern coupled from the output of the first circuit and synchronized N bit scramble bit pattern generated at the first circuit.

12. The data processing system of claim 11, wherein the number N is equal to 64.

13. The data processing system of claim 11, wherein the synchronized N bit scramble bit pattern is generated by starting the N bit scramble bit pattern using a 4 bit sync bit pattern within the N bit scramble bit pattern.

14. The data processing system of claim 13 wherein the propagation delay time is the time for a sync bit in the sync bit pattern to propagate from the second circuit to the output of the first circuit.

15. The data processing system of claim 13, wherein the N bit scramble bit pattern is consecutive bits 0 through 63 defined as sixteen 4 bit hex bytes [926F4A736F4A5328], the first byte starting at bit 0, the sixteenth hex byte starting at bit 60.

16. The data processing system of claim 15, wherein bits 61, 62, 63 and 0 of the N bit scramble bit pattern define the 4 bit sync bit pattern and the first and second XOR combinations of the first data with the N bit scramble bit pattern commence at bit 0.

17. The data processing system of claim 11, wherein the first circuit is a programmable delay circuit for phase aligning the data channel with a plurality of like data channels, wherein the data channel and the plurality of like data channel communicate parallel bits of data signal.

18. The data processing system of claim 11, wherein the N bit scramble bit pattern assures that the scramble data pattern has an average ratio of logic one states to logic zero states greater than or equal to 25 percent.

19. The data processing system of claim 11, wherein the second circuit is a latch holding circuit that outputs the first data in response to a first transition of a first clock signal.

20. The data processing system of claim 19, wherein the detected first data is clocked into a latch holding circuit in response to the first transition of a second clock signal of the same frequency and synchronous with the first clock signal.

* * * * *